US012221592B2

(12) United States Patent
Oberlin et al.

(10) Patent No.: US 12,221,592 B2
(45) Date of Patent: Feb. 11, 2025

(54) CRACKLING CLEANING COMPOSITION

(71) Applicant: Dow Global Technologies LLC, Midland, MI (US)

(72) Inventors: Anne Oberlin, Antibes (FR); Jordan Sarica, Nice (FR); Robert Krasnansky, Schindellegi (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 157 days.

(21) Appl. No.: 16/337,418

(22) PCT Filed: Oct. 6, 2017

(86) PCT No.: PCT/US2017/055510
§ 371 (c)(1),
(2) Date: Mar. 28, 2019

(87) PCT Pub. No.: WO2018/080761
PCT Pub. Date: May 3, 2018

(65) Prior Publication Data

US 2020/0040281 A1 Feb. 6, 2020

(30) Foreign Application Priority Data

Oct. 27, 2016 (EP) .................................... 16290207

(51) Int. Cl.
*C11D 3/18* (2006.01)
*C11D 1/722* (2006.01)
*C11D 3/20* (2006.01)
*C11D 3/22* (2006.01)
*C11D 17/00* (2006.01)

(52) U.S. Cl.
CPC .............. *C11D 3/181* (2013.01); *C11D 1/722* (2013.01); *C11D 3/2017* (2013.01); *C11D 3/2068* (2013.01); *C11D 3/225* (2013.01); *C11D 17/0043* (2013.01); *C11D 2111/12* (2024.01)

(58) Field of Classification Search
CPC ........... C11D 1/38; C11D 3/181; C11D 1/722; C11D 3/2017; C11D 3/2068; C11D 3/225; C11D 11/0017; C11D 17/0043; C11D 3/201; C11D 1/66
See application file for complete search history.

(56) References Cited

U.S. PATENT DOCUMENTS

| | | | | |
|---|---|---|---|---|
| 462,638 A | 11/1891 | Gilfillan | | |
| 4,711,739 A * | 12/1987 | Kandathil | C11D 3/3707 | 435/188 |
| 4,954,286 A | 9/1990 | Sepulveda et al. | | |
| 6,150,318 A | 11/2000 | Silvester et al. | | |
| 7,241,727 B2 * | 7/2007 | Hart | C11D 1/72 | 510/279 |
| 8,017,569 B2 * | 9/2011 | DeDominicis | C11D 1/835 | 510/181 |
| 8,193,138 B2 * | 6/2012 | Nekmard | C11D 3/2068 | 510/218 |
| 8,772,215 B2 * | 7/2014 | Ryther | C11D 3/06 | 510/218 |
| 9,458,414 B2 * | 10/2016 | Rieth | C11D 7/264 | |
| 2005/0227897 A1 * | 10/2005 | Nelson | C11D 3/48 | 510/407 |
| 2007/0015675 A1 | 1/2007 | Painter et al. | | |

FOREIGN PATENT DOCUMENTS

| | | | | |
|---|---|---|---|---|
| CN | 103690431 A | 4/2014 | | |
| DE | 102010061899 A1 | 5/2012 | | |
| EP | 1270711 A1 | 1/2003 | | |
| JP | 2000273485 A | 10/2000 | | |
| JP | 2009286734 A | 12/2009 | | |
| JP | 2012046725 A | 3/2012 | | |
| JP | 2014152280 A | 8/2014 | | |
| KP | 2007113552 A | 11/2007 | | |
| WO | WO-9507974 A1 * | 3/1995 | | C11D 7/263 |

OTHER PUBLICATIONS

Ebisike, Kelechi & Attahdaniel, Emmanuel & Anakaa, M & Kefas, H & Olusunle, Samuel.Effect of Sodium Hydroxide Thickener on Grease Production. American Chemical Science Journal. 13. 1-8. (2016).*

Japanese Office Action for the corresponding Japanese Application No. 2019-518943; Date of Mailing: Jun. 11, 2021; 3 pages.

* cited by examiner

*Primary Examiner* — Angela C Brown-Pettigrew
*Assistant Examiner* — Preeti Kumar
(74) *Attorney, Agent, or Firm* — CANTOR COLBURN LLP

(57) ABSTRACT

A cleaning composition comprising: (a) from 20 to 49 wt % propellant; (b) from 25 to 55 wt % water; (c) from 3 to 12 wt % glycol alkyl ether; (d) from 2 to 12 wt % of an alcohol selected from the group consisting of ethanol and isopropanol; (d) from 1.5 to 5 wt % of a nonionic surfactant; and (e) from 0.3 to 1.5 wt % of a thickener.

19 Claims, No Drawings

CRACKLING CLEANING COMPOSITION

This invention relates to a fabric care composition which forms a gel or foam exhibiting a crackling sound and/or fizzing.

Aqueous systems containing liquefied gases are known, e.g., in JP2009286734. However, this reference uses larger amounts of liquefied gas and is applied to skin. The reference does not suggest the cleaning composition claimed herein.

STATEMENT OF THE INVENTION

The present invention provides a cleaning composition comprising: (a) from 20 to 49 wt % propellant; (b) from 25 to 55 wt % water; (c) from 3 to 12 wt % glycol alkyl ether; (d) from 2 to 12 wt % of an alcohol selected from the group consisting of ethanol and isopropanol; (d) from 1.5 to 5 wt % of a nonionic surfactant; and (e) from 0.3 to 1.5 wt % of a thickener.

DETAILED DESCRIPTION

Percentages are weight percentages (wt %) and temperatures are in ° C., unless specified otherwise. Operations were performed at room temperature (20-25° C.), unless specified otherwise. Weight percentages of components are based on weights of ingredients as used, e.g., wt % of surfactant is calculated including any water that may be in a commercial surfactant product. Alkyl groups are saturated $C_1$-$C_{20}$ hydrocarbyl groups which may be straight or branched. Aralkyl groups are substituent groups having an alkyl chain and an aromatic ring (preferably a benzene ring) and which may be attached either through an alkyl carbon or an aryl carbon.

A propellant is a material which is in the vapor phase at 20° C. and atmospheric pressure (101 kPa). Preferably a propellant has a boiling point at atmospheric pressure no lower than −50° C., preferably no lower than −45° C.; preferably no higher than 15° C., preferably no higher than 10° C., preferably no higher than 5° C., preferably no higher than 0° C.

Mixtures of propellants may be used. Preferred propellants include alkanes, especially n-butane, propane isobutane, and mixtures thereof. An especially preferred propellant is a mixture of n-butane and propane, preferably in a ratio from 4:1 to 1:4, preferably 3:1 to 1:3, preferably from 2:1 to 1:2. Preferably, the composition comprises at least 23 wt % propellant, preferably at least 26 wt %, preferably at least 30 wt %; preferably no more than 46 wt %, preferably no more than 43 wt %, preferably no more than 40 wt %, preferably no more than 37 wt %.

Preferably a glycol alkyl ether has from six to fifteen carbon atoms; preferably at least seven, preferably at least eight; preferably no more than twelve, preferably no more than eleven, preferably no more than ten. Preferably, a glycol alkyl ether is a mono-alkyl ether. Preferably, a glycol alkyl ether has two or three ethylene oxide (EO) or propylene oxide (PO) units, i.e., molecules of EO or PO which have reacted to form a di- or tri-glycol, preferably two EO or PO units. Numbers of polymerized EO or PO units are number averages. Preferably an alkyl group in a glycol alkyl ether has from two to six carbon atoms; preferably at least three; preferably no more than five, preferably no more than four. Especially preferred alkyl glycol ethers include dipropylene glycol mono-n-propyl ether and dipropylene glycol mono-n-butyl ether. Preferably, the composition comprises at least 4 wt % glycol alkyl ether(s), preferably at least 5 wt %, preferably at least 6 wt %; preferably no more than 11 wt %, preferably no more than 10 wt %, preferably no more than 9.5 wt %.

Preferably, the composition comprises at least 3 wt % of the alcohol, preferably at least 4 wt %, preferably at least 4.5 wt %, preferably at least 5 wt %; preferably no more than 11 wt %, preferably no more than 10 wt %, preferably no more than 9.5 wt %. Preferably, the alcohol is ethanol.

Preferably, nonionic surfactants have an alkyl or aralkyl group having eight to eighteen carbon atoms and three to fifteen polymerized ethylene oxide residues. Preferably nonionic surfactants have an alkyl group rather than an aralkyl group. Preferably, the nonionic surfactant has at least five polymerized ethylene oxide residues, preferably at least seven; preferably no more than twelve, preferably no more than eleven, preferably no more than ten. The number of polymerized ethylene oxide residues is a number average. Preferably, the nonionic surfactant has an alkyl group having at least ten carbon atoms, preferably at least twelve; preferably no more than sixteen, preferably no more than fourteen. Alkyl groups may be mixtures of different chain lengths, e.g., $C_{12}$-$C_{14}$. Preferably, alkyl groups are branched. In a preferred embodiment, from one to six polymerized units of propylene oxide are present between the alkyl group and the polymerized ethylene oxide units, preferably from three to five. Preferably, the composition comprises at least 2 wt % nonionic surfactant(s), preferably at least 2.5 wt %, preferably at least 3 wt %; preferably no more than 4.5 wt %, preferably no more than 4 wt %.

Preferably, the thickener is a cellulose ether, alkali swellable emulsion polymer, hydrophobically modified alkali swellable emulsion polymer, hydrophobically modified urethane, guar, gum. Preferably, the thickener is a cellulose ether. Preferably, the cellulose ether is an alkyl ether, a hydroxyalkyl ether or a combination thereof. Preferably, the cellulose ether comprises $C_1$-$C_4$ alkyl and/or hydroxyalkyl groups bonded to hydroxyl oxygen atoms. Preferably, the thickener is hydroxyethyl cellulose. Preferably, the thickener has a viscosity from 500 to 15,000 MPa·s for a 2 wt % aqueous solution, preferably 2,000 to 10,000. Preferably, the composition comprises at least 0.35 wt % thickener(s), preferably at least 4 wt %, preferably at least 0.5 wt %, preferably at least 0.55 wt %; preferably no more than 1.3 wt %, preferably no more than 1 wt %, preferably no more than 0.8 wt %.

Preferably, the composition comprises at least 30 wt % water, preferably at least 35 wt %, preferably at least 40 wt %; preferably no more than 53 wt %, preferably no more than 51 wt %.

The composition may also comprise various other optional ingredients including, without limitation, chelant (e.g., sodium citrate), preservatives (e.g., BHT), salts of fatty acids, anionic surfactant (Sodium Laureth sulfate for instance), hydrogen peroxide; neutralizer (sodium hydroxide, MEA, TEA), enzymes, perfumes Preferably, the composition is stored under greater than atmospheric pressure in a can. Preferably, the composition is applied to fabric or other inanimate surfaces, and not to skin. This invention is also directed to a method for cleaning fabric by applying the composition to the fabric, preferably at room temperature.

EXAMPLES

Example 1

| Pre-spotter ingredients | form. A weight, g | form. A % weight | form. B weight, g | form. B % weight | form. C weight, g | form. C % weight |
|---|---|---|---|---|---|---|
| water | 31.1 | 47.8 | 35.6 | 44.2 | 27 | 29.7 |
| EtOH | 5.6 | 8.6 | 3.375 | 4.2 | 10 | 11.0 |
| DOWANOL DPnP[1] | 5.6 | 8.6 | 3.375 | 4.2 | | |
| DOWANOL DPnB[2] | | | | | 10 | 11.0 |
| CELLOSIZE QP4400H[3] | 0.4 | 0.6 | 0.4 | 0.5 | 0.3 | 0.3 |
| TERGITOL 15-S-9[4] | 2.3 | 3.5 | 2.25 | 2.8 | 2.5 | 2.7 |
| n butane/propane 2.5 bars | 20.1 | 30.9 | 35.5 | 44.1 | 41.2 | 45.3 |
| total | 65.11 | 100 | 80.5 | 100 | 91 | 100 |
| appearance | fizzing gel | | fizzing mousse | | fizzing liquid | |

[1]Dipropylene glycol mono n-propyl ether

[2]Dipropylene glycol mono n-butyl ether

[3]Medium molecular weight hydroxyethyl cellulose

[4]$C_{12}$-$C_{14}$ alkyl, 9 moles polymerized ethylene oxide

Juice Formulation:

In a beaker, add the DI water and under mechanical agitation, create a vortex into which the powder CELLOSIZE QP4400H is added slowly. The mixture is hazy.

Wait until the complete hydration of the CELLOSIZE QP4400H (within 3 hours). The mix is then transparent and more viscous.

Add the TERGITOL 15-S-9 (the mix remains transparent), and then the DOWANOL DPnP or DOWANOL DPnB, which generate haziness and decrease the viscosity.

The addition of EtOH will make the formulation transparent again.

Cans Filling

The cans are filled with 45 g of the juice. Then, the cans are set with the specific aerosol cap.

We fill the aerosol with a n-butane/propane bottle pressurized at 2.5 bars.

If the quantity of gas in the aerosol is not enough, then the aerosols are put in a freezer during 15-20 min.

After this time, we finished the gas filling.

Primary Cleaning:

Pre-Treatment Phase:

Six dust sebum emulsion (supplied by CFT company-code 020) circular stains have been applied on Cotton (Pillow case, code T13 from Wfk company) with a brush and a stencil so that all the stains have the same surface and shape.

The stains have been stored at room temperature (22° C.) during 2 hours to let them dry.

Then, some stains have been treated with either the aerosol formulations A, B or C, by pressing the button during 5 seconds.

After waiting 2 hours, a spatula was used to remove the aerosol formulation/stains system from the surface of the cotton fabric.

The gel system formulation A allows the removal of a bigger amount of stains compared to mousse system formulation B and liquid system formulation C.

Cleaning Phase:

The primary cleaning performance test is performed on European washing machines, from Miele, model NOVO- TRONIC W1614, set at: 30° C., 30 minutes short program, 1000 rpm, water hardness tuned at 30° TH and loaded with 3.5 kg ballast fabrics.

The primary cleaning performance test is measured after 1 wash cycle on stains on the pillow case cotton code T13 from Wfk Company.

Each washing machine is loaded with ballast fabric and stains, and we add 40 g standard detergent model ECE-2 (no phosphate, for fastness Tests acc/ISO 105-C08/C09 from Testgewee GmbH).

After wash and line dry, each stains are measured in 6 different areas.

We measure the reflectance Y (D65) using a spectrophotometer from Konica Minolta, model CR 2600d. When Y value is high, the stain removal is also high.

Primary Cleaning Results:

| formulations | Average of Y(D65) | Average of stdev Y |
|---|---|---|
| formulation A | 53.8 | 2.5 |
| formulation B | 48.7 | 3.5 |
| formulation C | 46.1 | 1.0 |
| Non treated | 46.5 | 3.5 |

Conclusion:

We have been able to create some pre spotter aerosols with different textures: crackling gel (formulation A), crackling mousse (formulation B) and crackling liquid (formulation C).

Dust sebum emulsion stain pretreated with the formulation A is significantly washed better compared with stains pre-treated with the formulation B and C. The crackling gel system helps in "extracting" the stain out of the fabric, allowing a self-scrubbing effect.

Example 2

Juice formulation and can filling protocols are identical to example 1.

Formulations:

| Ingredients (in order of addition) | Formulation 1 grams | Formulation 2 grams | Formulation 3 grams) | Formulation 4 grams |
|---|---|---|---|---|
| Deionized water | 47.8 | 47.8 | 47.8 | 47.8 |
| CELLOSIZE QP4400H | 0.6 | 0.6 | 0.6 | 0 |
| TERGITOL 15-S-9 | 3.6 | 3.6 | 0 | 3.6 |
| DOWANOL DPnP | 8.6 | 0 | 8.6 | 8.6 |
| Ethanol | 8.6 | 8.6 | 8.6 | 8.6 |
| n-butane/propane 2.5 bars | 0 | 30.8 | 30.8 | 30.8 |
| Appearance at the cans exit | Liquid/gel | foam | Fizzing/liquid | Fizzing foam |

Pre-Treatment Phase:

Dust sebum emulsion (supplied by CFT company-code 020) circular stains have been applied on Cotton (Pillow case, code T13 from Wfk company) with a brush and a stencil so that all the stains have the same surface and shape and same weight: 0.9 g. We applied 9 stains per pillow case and we have 4 replicates per formulation.

The stains have been stored at room temperature (22° C.) during 3 hours to let them dry.

Then, some stains have been treated with either the aerosol formulations 1, 2, 3 or 4. Then, the aerosol formulations have been in contact with the stains for 20 minutes.

Then, a spatula was needed to remove the aerosol formulation/stains system from the surface of the cotton fabric.

Cleaning Phase:

The primary cleaning performance test is performed on European washing machines, from Miele, model Novotronic W1614, set at: 30° C., 30 minutes short program, 1000 rpm, water hardness tuned at 30° TH and loaded with 3.5 kg ballast fabrics.

The primary cleaning performance test is measured after 1 wash cycle on stains on the pillow case cotton code T13 from Wfk Company.

Each washing machine is loaded with ballast fabric and stains, and we add 40 g standard detergent model ECE-2 (no phosphate, for fastness Tests acc/ISO 105-C08/C09 from Testgewee GmbH).

After wash and line dry, each stains are measured in 6 different areas.

We measure the reflectance Y (D65) using a spectrophotometer from Konica Minolta, model CR 2600d. When Y value is high, the stain removal is also high.

Primary Cleaning Results:

| Formulations | Average of Y(D65) | Average of stdev |
|---|---|---|
| Formulation A | 62.9 | 1.4 |
| Formulation 1 | 61.6 | 1.5 |
| Formulation 2 | 59.9 | 1.5 |
| Formulation 3 | 47.5 | 1.7 |
| Formulation 4 | 57.5 | 1.1 |
| Non treated | 48.9 | 1.5 |

Conclusion:

Removing an ingredient from the pre spotter formulation decreases the stain removal performance. This combination of ingredients is relevant.

Example 3

Juice formulation and can filling protocols are identical to example 1.

Pre-Treatment Phase:

Dust sebum emulsion circular stains have been applied on Cotton (Pillow case, code T13 from Wfk company) with a brush and a stencil so that all the stains have the same surface and shape and same weight: 0.4 g. We applied 9 stains per pillow case and we have used 2 replicates per formulation. Stains are left to dry overnight. Two grams of pre spotter formulations are applied on stains and left for 20 minutes.

The stains are not scrubbed and no detergent have been used, to assess pre spotter primary detergency only.

Fabrics are washed once, along with a ballast, using express program at 30° C., 1000 tr/min with no detergent and with a water hardness of 30° TH Fabrics are let to dry out in the darkness and performance is studied through reflectance measurement using a spectrocolorimeter.

Influence of the Nonionic Surfactant on Pre Spotter Performance.

Formulations:

| Ingredients (in order of addition) | 0S-WP % weight | 1.8S-WP % weight | 3.6S-WP % weight | 4S-WP % weight |
|---|---|---|---|---|
| Water | 51.4 | 49.6 | 47.8 | 47.4 |
| CELLOSIZE QP4400H | 0.6 | 0.6 | 0.6 | 0.6 |
| TERGITOL 15-S-9 | 0 | 1.8 | 3.6 | 4 |
| DOWANOL DPnP | 8.6 | 8.6 | 8.6 | 8.6 |
| Ethanol | 8.6 | 8.6 | 8.6 | 8.6 |
| n butane/propane (80/20) 2.5 bars | 30.8 | 30.8 | 30.8 | 30.8 |
| Rate of the visual viscosity (1 is liquid and 4 is the most viscous) | 1 | 2 | 3 | 4 |
| Appearance at the exit of the can | Crackling gel | | | |

Primary Cleaning Results

| formulations | Average of Y(D65) | Average standard deviation |
|---|---|---|
| 0S-WP | 52.8 | 0.6 |
| 1.8S-WP | 55.5 | 1.1 |
| 3.65S-WP | 57.9 | 0.7 |
| 4S-WP | 57.1 | 0.4 |

Conclusion:

Primary cleaning performance increases with the quantity of surfactant added on the pre spotter which is also linked with the visual viscosity and fizzing of the crackling gel.

Influence of the Rheology Modifier on Primary Cleaning

Formulations:

| Ingredients (in order of addition) | 0 RM % weight | 0.6 RM % weight | 1.2 RM % weight |
|---|---|---|---|
| Water | 48.4 | 47.8 | 47.2 |
| CELLOSIZE QP4400H | 0 | 0.6 | 1.2 |
| TERGITOL 15-S-9 | 3.6 | 3.6 | 3.6 |
| DOWANOL DPnP | 8.6 | 8.6 | 8.6 |
| Ethanol | 8.6 | 8.6 | 8.6 |
| n butane/propane (80/20) 2.5 bars | 30.8 | 30.8 | 30.8 |
| Rate of the visual viscosity (1 is liquid and 3 is the most viscous) | 1 | 2 | 3 |
| Appearance at the exit of the cans | Fizzing liquid/foam when applied | Crackling gel | Crackling gel |

Primary Cleaning Results

| formulations | Average of Y(D65) | Average standard deviation |
|---|---|---|
| 0-RM | 56.0 | 0.7 |
| 0.6-RM | 57.9 | 0.7 |
| 1.2-RM | 58.7 | 0.8 |

Conclusion:

Primary cleaning performance increases with the quantity of rheology modifier added on the pre spotter, which is also linked with the visual viscosity and fizzing of the crackling gel.

Influence of the Propellant on Primary Cleaning Formulations

| Ingredients (in order of addition) | 3.6S-WP % weight | 3.6S-NP % weight |
|---|---|---|
| Water | 47.8 | 78.6 |
| CELLOSIZE QP4400H | 0.6 | 0.6 |
| TERGITOL 15-S-9 | 3.6 | 3.6 |
| DOWANOL DPnP | 8.6 | 8.6 |
| Ethanol | 8.6 | 8.6 |
| n butane/propane (80/20) 2.5 bars | 30.8 | 0 |
| Rate of the visual viscosity (1 is liquid and 2 is the most viscous) | 2 | 1 |
| Appearance | Crackling gel | Liquid |

Primary Cleaning Results

| formulations | Average of Y(D65) | Average standard deviation |
|---|---|---|
| 3.6S-WP | 57.9 | 0.7 |
| 3.6S-NP | 55.4 | 0.8 |

Conclusion:

Primary cleaning performance increases when the propellant is present in the pre spotter. Primary cleaning performance is also linked with the visual viscosity and fizzing of the crackling gel.

The invention claimed is:

1. A fabric care cleaning composition comprising:

from 20 to 49 wt % propellant; from 25 to 55 wt % water; from 3 to 12 wt % glycol alkyl ether wherein the glycol alkyl ether has from seven to twelve carbon atoms; from 3 to 12 wt % of an alcohol selected from the group consisting of ethanol and isopropanol; from 1.5 to 5 wt % of a nonionic surfactant; and from 0.3 to 1.5 wt % of a thickener wherein the thickener is selected from the group consisting of a cellulose ether, alkali swellable emulsion polymer hydrophobically modified alkali swellable emulsion polymer, hydrophobically modified urethane, guar and gum.

2. The fabric care cleaning composition of claim 1 in which the thickener is a cellulose alkyl ether, a cellulose hydroxyalkyl ether or a combination thereof.

3. The fabric care cleaning composition of claim 2 in which the nonionic surfactant has an alkyl group having eight to eighteen carbon atoms and five to fifteen polymerized ethylene oxide residues.

4. The fabric care cleaning composition of claim 3 comprising from 23 to 43 wt % propellant; from 35 to 53 wt % water; from 3 to 10 wt % glycol alkyl ether; from 5 to 10 wt % of ethanol; from 3 to 4.5 wt % of a nonionic surfactant; and from 0.35 to 1 wt % of a thickener.

5. The fabric care cleaning composition of claim 4 in which the thickener is hydroxyethyl cellulose.

6. The fabric care cleaning composition of claim 5 in which the glycol alkyl ether has from eight to eleven carbon atoms and an alkyl group has from two to five carbon atoms.

7. The fabric care cleaning composition of claim 6 in which the nonionic surfactant has an alkyl group having ten to sixteen carbon atoms and seven to ten polymerized ethylene oxide residues.

8. The fabric care cleaning composition of claim 7 in which the propellant is a mixture of propane and butane.

9. The fabric care cleaning composition of claim 1, wherein the fabric care cleaning composition contains 6 to 12 wt % of the glycol alkyl ether.

10. A method of cleaning fabric comprising applying a fabric care cleaning composition of claim 1 to a fabric.

11. The method of claim 10, wherein the thickener is a cellulose alkyl ether, a cellulose hydroxyalkyl ether or a combination thereof.

12. The method of claim 11, wherein the nonionic surfactant has an alkyl group having eight to eighteen carbon atoms and five to fifteen polymerized ethylene oxide residues.

13. The method of claim 12, wherein the cleaning composition includes 23 to 43 wt % of the propellant; 35 to 53 wt % of water; 3 to 10 wt % of the glycol alkyl ether; 5 to 10 wt % of the ethanol; 3 to 4.5 wt % of the nonionic surfactant; and 0.35 to 1 wt % of the thickener.

14. The method of claim 12, wherein the glycol alkyl ether has from eight to eleven carbon atoms and an alkyl group has from two to five carbon atoms.

15. The method of claim 14, wherein the nonionic surfactant has an alkyl group having ten to sixteen carbon atoms and seven to ten polymerized ethylene oxide residues.

16. The method of claim 10 wherein the composition is a crackling gel.

17. The fabric care cleaning composition of claim 1 consisting essentially of the propellant; the water; the glycol alkyl ether; the alcohol selected from the group consisting of ethanol and isopropanol; the nonionic surfactant;

the thickener, and optionally one or more of the following: chelant, preservative, salt of fatty acids, anionic surfactant, hydrogen peroxide, neutralizer, enzyme, and perfume.

18. The fabric care cleaning composition of claim 1 wherein the amount of the alcohol is from greater than 5 up to 12 weight percent.

19. The fabric care cleaning composition of claim 1 wherein the amount of the alcohol is from 8.6 to 12 weight %.

* * * * *